United States Patent [19]
Ross et al.

[11] Patent Number: 5,644,683
[45] Date of Patent: Jul. 1, 1997

[54] PRINT MODE AND SYSTEM TO ALLEVIATE WAIT-BANDING

[75] Inventors: Eric P. Ross, Camas; Thieu X. Dang, Vancouver, both of Wash.

[73] Assignee: Hewlett-Packard Company, Palo Alto, Calif.

[21] Appl. No.: 398,223

[22] Filed: Mar. 3, 1995

[51] Int. Cl.$^6$ ............................................. G06K 15/00
[52] U.S. Cl. ............................................. 395/108; 347/41
[58] Field of Search ............................. 395/109, 108, 395/104, 101, 113, 114, 116, 117; 347/43, 16, 102, 41, 12, 13, 40, 37; 358/502, 503, 463, 298

[56] References Cited

U.S. PATENT DOCUMENTS

| | | | |
|---|---|---|---|
| 4,855,752 | 8/1989 | Bergstedt | 346/1.1 |
| 5,043,748 | 8/1991 | Katayama et al. | 346/140 R |
| 5,198,833 | 3/1993 | Kubota | 346/140 R |
| 5,216,754 | 6/1993 | Sathi et al. | 395/113 |
| 5,359,355 | 10/1994 | Nagoshi et al. | 347/9 |
| 5,477,246 | 12/1995 | Hirabayashi et al. | 347/12 |
| 5,489,926 | 2/1996 | Arbeiter | 347/16 |

FOREIGN PATENT DOCUMENTS

A0516420  5/1992  European Pat. Off. ......... B41J 2/205

*Primary Examiner*—Dwayne Bost
*Assistant Examiner*—Tracy M. Legree
*Attorney, Agent, or Firm*—H. Brian Davis

[57] ABSTRACT

An improved print mode and system for alleviating wait-banding is disclosed. When printing multiple passes over the same swath, such as when printing secondary colors in a color image, a hue shift can occur if the time between when the two passes are deposited are laid down is not regulated. This is true because the secondary color that results depends on how dry the ink from the first pass is when the second pass is deposited. These variations in color result in undesirable horizontal bands, a problem referred to as "wait-banding." Typical ink-jet printers compose in page sectors, but print in scans or passes. The time that it takes to compose the page sectors varies from sector to sector. These variations can cause differences in the time intervals between when overlapping passes will be printed, thus resulting in wait-banding. The disclosed method creates a running average for the passes based on past experience with when passes were made. This running average is used to space out the passes within a page sector so that the passes are more uniformly distributed in time, thus alleviating wait-banding.

14 Claims, 5 Drawing Sheets

PRINT MODE AND SYSTEM TO ALLEVIATE WAIT-BANDING

BACKGROUND OF THE INVENTION

1. Field of the Invention

The present invention relates to scanning ink-jet printers, and particularly to a print method and system providing improved print quality.

2. Statement of the Relevant Art

Ink jet printers commonly use a scanning printhead to deposit a pattern or matrix of dots as the printhead is scanned across a print medium (page). After the printhead is scanned across the page, the page is incrementally advanced in a direction orthogonal to the scanning axis to position the medium for a subsequent scan. If the dots are sufficiently small and closely spaced, the pattern is perceived by the human eye as if the dots formed a continuous image. Dots of the three subtractive primary colors, cyan, magenta (CMY), and yellow, may be combined to create the visual perception of a wide range of colors. The printed image is composed of a contiguous series of horizontal swaths, which taken together, create the overall image. Each swath is the height of the array of nozzles on the printhead. More than one scan of the printhead may be made for each swath, and the scans can be interleaved between swaths to smooth out boundaries between swaths. This process is referred to as "shingling" because it is reminiscent of the way shingles are laid down on a roof.

The printer is usually connected to a host computing device, such as a personal computer. The host typically has an a video monitor to allow the user to interface with the device. When a user is working with an image in the host, this image is usually stored in terms of a graphical computer language, which is independent of any particular printer or monitor resolution, and is usually stored in terms of additive red, green, blue (RGB) primary colors. The image thus stored must be converted to a format usable by the printer, i.e., at the resolution of the printer and in CMY format. This conversion is typically done by means of a "driver," which typically is a software package installed in the host to work with the user's computer application. The driver typically compresses the information and sends it to the printer controller in terms of escape sequences in one of various graphics languages, such as Hewlett-Packard Company's Printer Control Language (PCL ™) that describe the image and where it is placed on the page. Each sequence describes only a single dot row on the page. The driver can send these sequences in packets of various sizes, as little as a single dot row, or hundreds of dot rows at a time.

Once the printer controller receives the PCL sequences it composes them into page sectors of information that represents exactly which dots and of which color go on the page. These page sectors are a full page wide and may be only a few scans worth of information, or may be several vertical inches of the image. The page sectors do not necessarily correspond to the size of packets of PCL sequences the driver has sent the controller. After the controller composes these page sectors, the controller converts the sectors into passes for the printhead. In other words, once a page sector has been composed, the controller must then determine exactly how it will cause the printhead to make its scans back and forth across the page to deposit the dots according to the image sector information. In many cases, a multi-pass per swath print mode is used. If the image involves color, the printer must prepare pass information for each of the colors used.

The printer can typically begin printing the passes very quickly after the page sector information is ready. However, the page sector information may be delayed because of various factors. For example, the complexity of the image may cause delays in the driver. Additional delays may be encountered in the controller during composition of the page sectors. Also the input/output interfaces at both the host and/or the printer can cause delays. After all of the passes have been printed for which page sector information is ready, no additional passes can be printed until new page sector information is available. If no page sector information is ready in the controller, the printhead must remain idle until there is enough information for another pass.

When multi-pass shingled printing is used, a problem called "wait-banding" can result from these delays. When a series of primary color passes are made to print a particular secondary color, the actual color resulting on the page can vary depending on the time delay between when the first pass is made and the second pass is made. This difference is due in large part to the ink drops of the first pass drying in different degrees before the drops of the second pass are deposited. For example, assume a large area of blue is to be printed. Assume that in one swath a cyan pass is made and then time T1 goes before a magenta pass is made over the cyan. A given hue of blue will result. On a contiguous swath, a cyan pass is made, but then a different time T2 goes by before the magenta pass is made. In this case, a slightly different hue of blue will result. The two contiguous swaths of different blue colors will be perceived as undesirable wait-banding. Wait-banding is particularly a problem in darker colors, such as darker blues.

One approach to deal with this problem would be to establish a fixed delay between each print pass, with the hope that by the time the passes are complete, the printer will have more page sector information available for printing. This approach, however, would disadvantageously increase the overall time needed to print any given page, even though page sector information is ready in advance of when the passes are made. In other words, the throughput of the printer would be unnecessarily decreased. Throughput is an important issue in the highly competitive ink-jet printer market.

There remains a need for a printing method and system that minimizes wait-banding without also unnecessarily decreasing the throughput of the printer.

SUMMARY OF THE INVENTION

The invention provides a method of printing with a scanning ink-jet printhead. This method includes the following steps: providing image data; composing page sectors of the image data, the page sectors being composed at a variable times; printing a series of passes according to the image data, the timing of the passes being dependent on the variable times; and determining an average time delay between the passes based on past experience with actual delays when previous passes were printed.

When an element described or claimed herein is said to be "programmed" to perform a given function or series of steps, it is intended to include any of various electronic methods of performing the recited functions or logical steps, such as with the use of software, firmware, state machines, etc.

A printing method and system are thus provided that minimizes the wait-banding problem. These problems are solved without an unnecessary decrease in throughput.

DETAILED DESCRIPTION OF THE ILLUSTRATED EMBODIMENT

Figure 1:
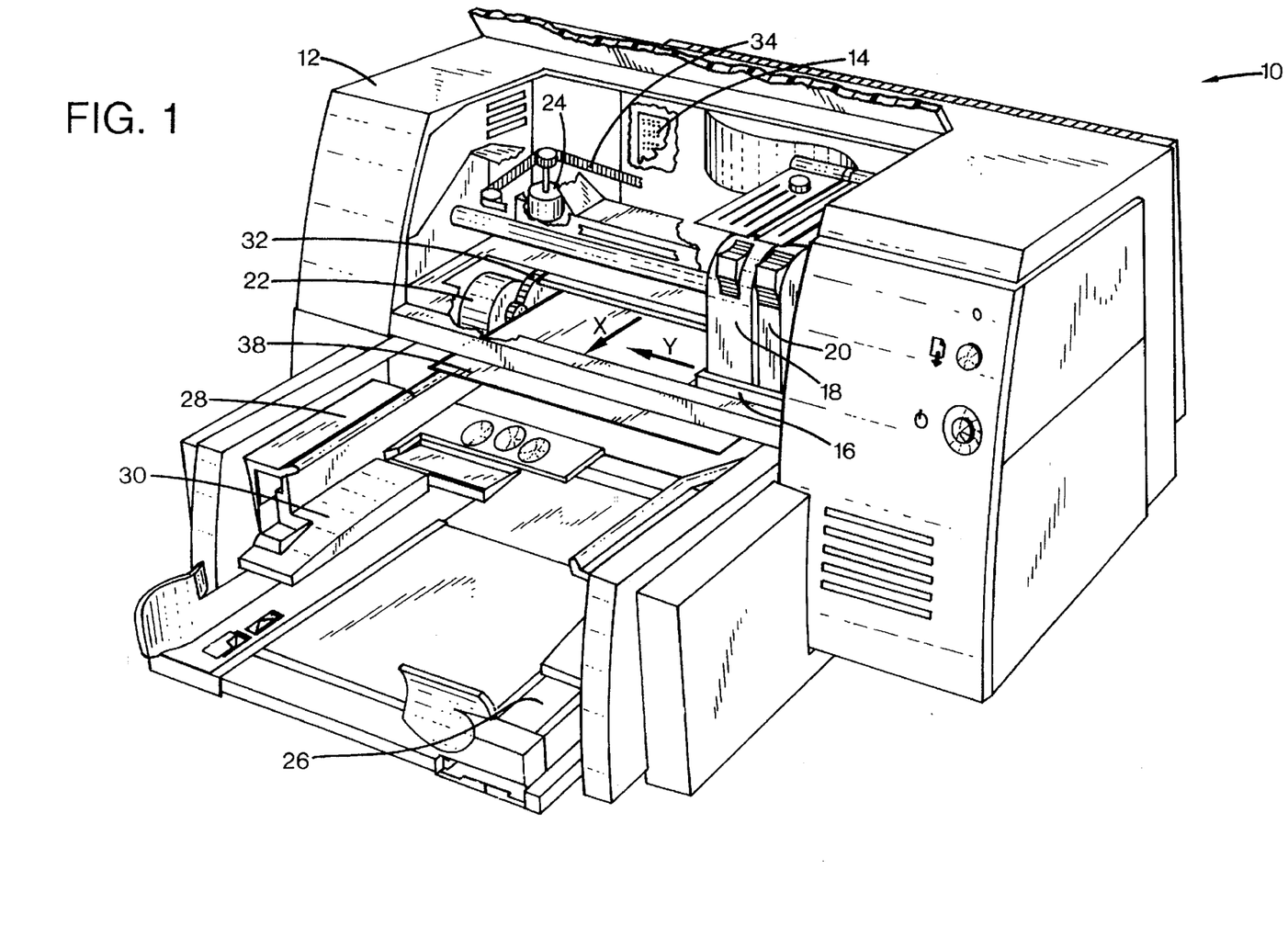
FIG. 1 is a perspective, partial cut-away, view of a printer of the invention.

FIG. 1 illustrates an ink-jet printer, generally indicated at 10, of the invention. Printer 10 includes a housing 12 in which are mounted a controller 14, a print cartridge carriage 16 (which receives print cartridges 18 and 20), medium advance motor 22, and carriage drive motor 24. Also attached to housing 12 are a paper input tray 26, wings 28, and paper output tray 30. Controller 14 is communicatively connected to a host printing device (not shown), such as a personal computer, from which it receives data signals representative of the image and/or text desired to be printed. Controller 14 is also communicatively connected with printheads 18 and 20, medium-advance motor 22, and carriage advance motor 24. Medium-advance motor 22 is linked via a gearing assembly 32 to polymeric rollers (not shown) that drive the print medium through the printer. Medium-advance motor 22 is also engaged via a clutch and gearing assembly (not shown) to wings 28 to selectively (based on input from controller 14) open or close wings 28. Carriage advance motor 24 is linked via a drive belt 34 to carriage 16. A stack of paper is placed in the input tray 26. Sheet of paper 38 is shown being printed on.

At the appropriate time, controller 14 actuates carriage advance motor 24 to drive carriage 26 in the carriage advance axis Y to scan printheads 18 and 20 over the current swath on sheet 38. As print cartridges 18 and 20 containing printheads (not shown) are scanned in the Y direction, the printheads are addressed by controller 14 to expel droplets of ink in the desired dot matrix pattern across sheet 38. After a scan is complete, controller 14 sends a signal to medium-advance motor 22 to drive sheet 38 incrementally in the medium-advance direction X shown so that the printheads can begin another pass. Multiple adjacent horizontal passes are printed in this manner to complete the printing of the desired image on the page. More than one pass can also be made over the same section without advancing the paper. As page 38 is printed it rests on wings 28. After page 38 is completed, and when the previous page (resting in output tray 30) is dry and/or when a new page is ready to print, wings 28 open up and allow page 38 to drop vertically down onto the output tray. Since the previous page is typically relatively dry, and since page 38 drops vertically down onto this previous page, it is intended that no smearing of the ink will occur on the previous page.

Figure 2:
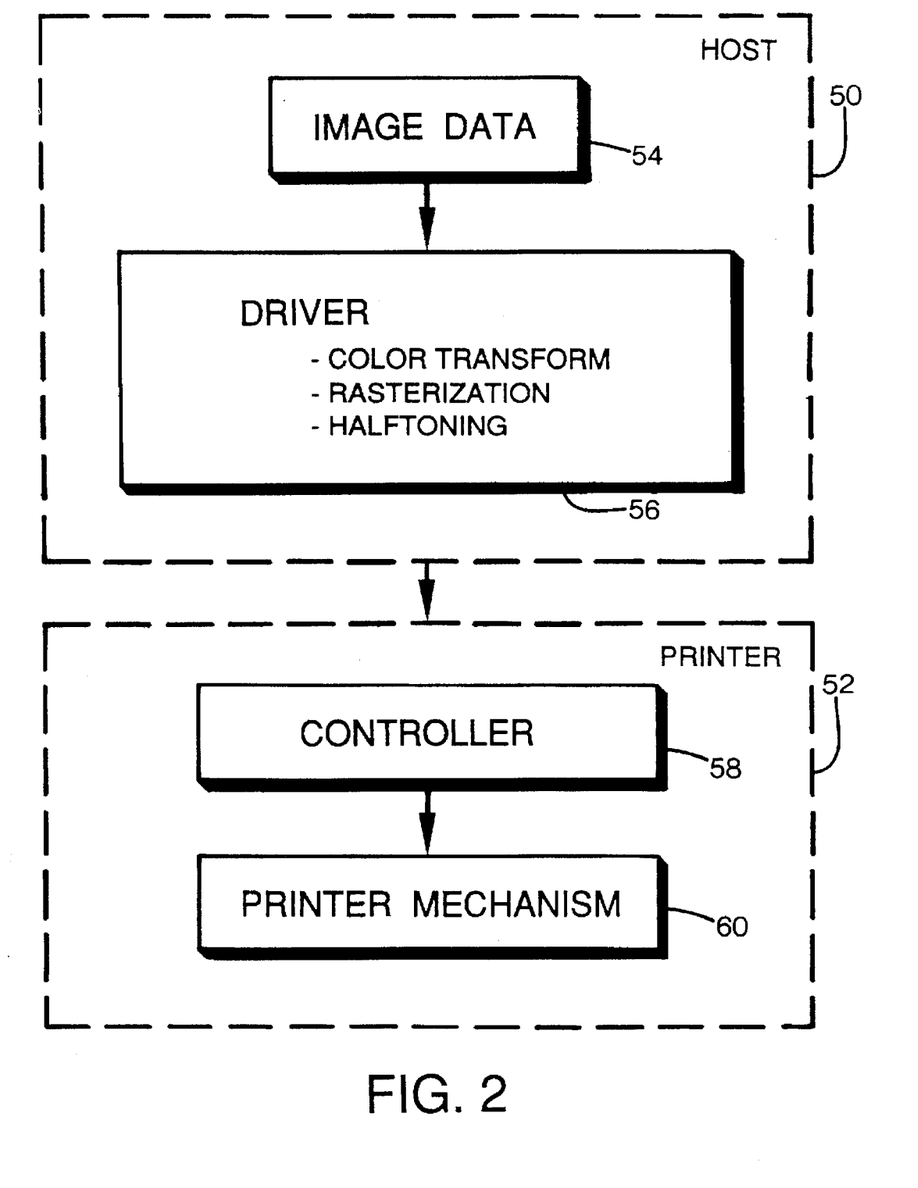
FIG. 2 is a block schematic diagram of a printing system of the invention.

FIG. 2 schematically illustrates a printing system of the invention. This printing system includes a host 50 and a printer 52. Host 50 contains image data 54 and driver 56. Printer 52 includes controller 58 and printer mechanism 60. Host 50 is typically a computing device such as a personal computer and typically includes an input mechanism such as a keyboard and/or mouse and a video output such as a computer monitor. Image data 54 may include text and/or graphics created by a user and/or images derived from some other source, such as a scanner, photo CD camera, or video recorder. This image data may be stored in any of various formats or computer graphics languages, which may be independent of the resolution of any particular computer monitor or printing device. Image data 54 is typically held in the host as red, green, blue (RGB) additive color format at 256 levels of intensity for each color.

Driver 56 performs several important functions to the image data, these being mainly color transformation, rasterization, and halftoning. During color transformation, the image data 54 is convened to subtractive cyan, magenta, and yellow (CMY) color planes. During rasterization, the image data is converted over to a rasterized format consistent with the resolution of the printer involved. For example, if the resolution is 300 DPI, the image received from the host 50 is rasterized to 300 DPI. During the halftoning step, the essentially analog per pixel (256 levels per pixel) must be convened to only binary information for each pixel: a dot on or a dot off. The information must be halftoned because ink-jet printers are essentially binary in nature. In other words, they can only print two levels for each color: on or off. Halftoning is described in *Digital Halftoning*, Robert Ulichney, MIT Press, 1987. The driver then converts this rasterized binary pixel information into escape sequences to be communicated to the printer. These sequences communicate one dot row of information at a time. These dot row sequences are communicated in series to the printer controller 58.

The controller determines which dots will be printed in which pass or scan of the printhead. It is common in ink-jet printers for a given swath of printing to be composed of more than one pass. Also, to smooth out boundaries between swaths, the passes are often interleaved between swaths. An example of interleaved multi-pass printing is disclosed in U.S. Pat. No. 4,967,203 (Doan et al.), assigned to the present assignee. The controller also determines when wings 28 will open and when motor 22 will engage to drive a new page through the printer. The governor uses the timer to perform this function.

The driver 56 is typically software installed into the memory of the host. The controller 58 is typically implemented in firmware on a controller card in the printer. However, this separation between host, driver and controller may be altered. For example, both the driver and controller may be implemented in software held in the host memory. In this case, the printer would simply act upon very explicit scan-by-scan pixel instructions received from the host, since the functions of rasterization, color transform, halftoning and page sector management would all be performed at the host level. This implementation is referred to as a "dumb printer." On the other extreme, both the driver and the controller may be implemented as firmware and/or software in the printer, with all functions of rasterization, color transform, halftoning and page sector management being handled at the printer. In this embodiment, the host supplies the image data at a very high level (typically in a resolution-independent graphics language) to the printer. This implementation is referred to as a "smart printer."

Figure 3:
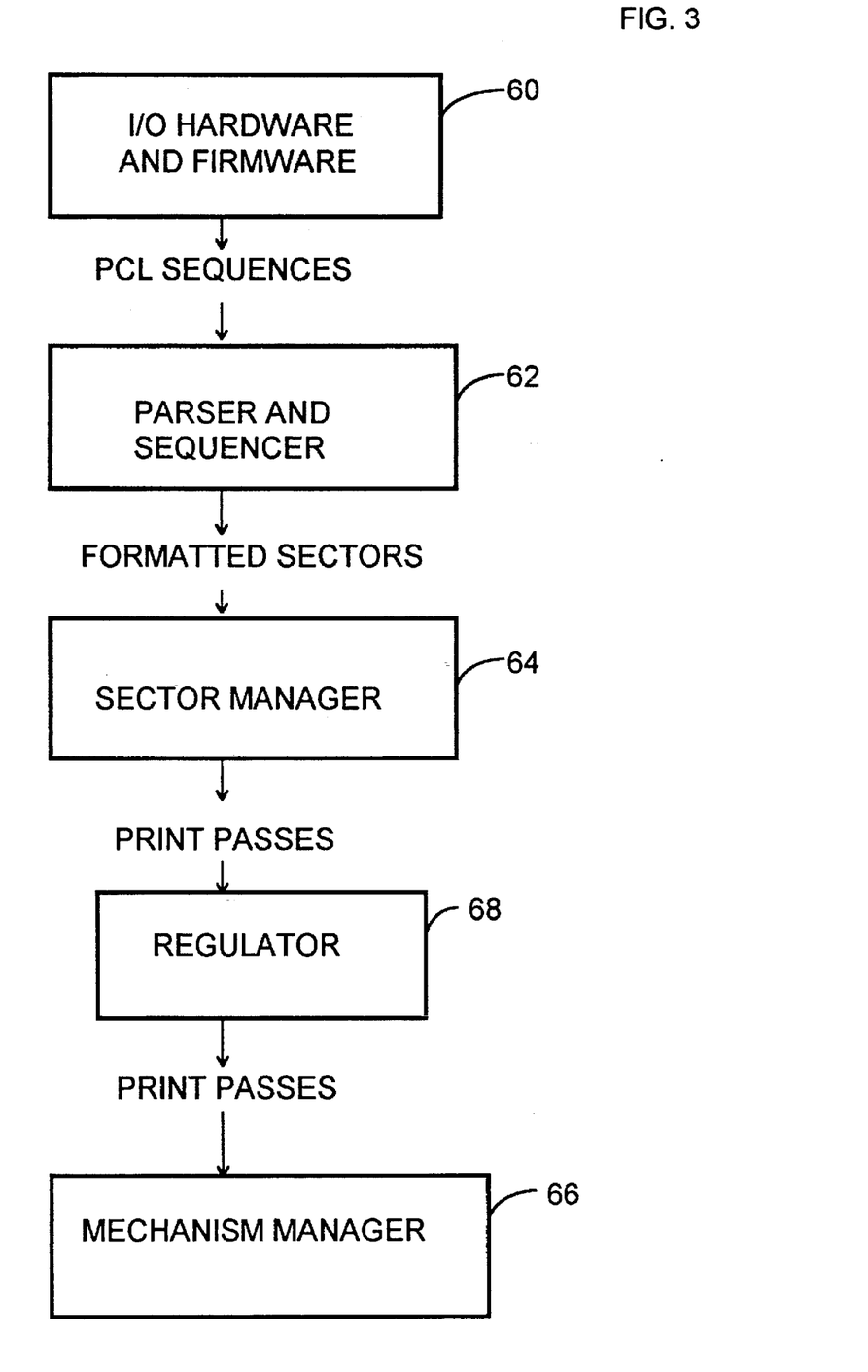
FIG. 3 is a block schematic diagram of a controller of the invention.

The details of controller 58 are illustrated in reference to FIG. 3. These components are input/output (I/O) hardware and firmware 60, parser and sequencer 62, page sector manager 64, mechanism manager 66, and regulator 68. The I/O interface receives the image information from the driver. The I/O interface 60 communicates this information to the parser and sequencer 62. The parser and sequencer performs the step of composing the sections of printed dots that will be printed on the page. As stated earlier, the position and color of dots has already been decided by the driver, but the parser and sequencer 62 actually composes a bit map of where the dots will lie on the paper. The parser and sequencer then communicates these sections of page information to the page sector manager 64 in terms of formatted page sections.

The page sector manager 64 performs the step commonly referred to as the print mode, in which the actual scans or passes of the printhead are determined. Thus the page sector manager 64 implements the particular patterns of dots laid down in each pass. For example, if a two-pass, shingled print mode is used, then the page sector manager prepares instructions to have the printhead lay down dots in whatever pattern is chosen for the each of the two passes. If a four pass print mode is chosen, the page sector manager 64 prepares instructions for each of the four passes. The page sector manager transmits the information of these print passes to the mechanism manager 66. The mechanism manager 66 drives the actual hardware (the paper advance motor, carriage-scan motor, printhead firing resistors, etc.) to lay the physical dots down on the paper. In the present invention, a regulator 68 is interposed between the page sector manager 64 and the mechanism manager 66 to regulate the times at which the print pass information is transmitted from the page sector manager to the mechanism manager.

The following Table 1 illustrates an interleaved four-pass print mode effect. In this table, the numbers represent the print pass, and the letters represent the four different complementary print patterns. The first pattern is labeled "A," the second pattern is labeled "B," the third labeled "C," and the fourth labeled "D." In a first pass of the printhead, a pattern of dots is printed, leaving certain dot positions empty. The print medium is then advanced (for example one-fourth of the effective printhead height) to place a new group of nozzles in position to complete a pass. A second pass is then made with the entire printhead to deposit a second pattern of dots, thus filling in a portion of the interstitial positions in the first swath and also printing the second pattern over a portion of a second swath. This process is repeated for the third and fourth passes. Then the paper is again advanced one-fourth of the effective nozzle array height and the process is repeated. In this way, successive print medium advances and alternating first, second, third, and fourth patterns are printed with the entire printhead to complete a series of contiguous swaths with the four print mode patterns being thus interleaved between print swaths.

TABLE 1

| Print Passes | 1 | 2 | 3 | 4 | 5 | 6 | 7 | 8 | 9 | 10 | 11 | 12 |
|---|---|---|---|---|---|---|---|---|---|---|---|---|
| Swath 1 | A | B | C | D |   |   |   |   |   |   |   |   |
| Swath 2 |   | B | C | D | A |   |   |   |   |   |   |   |
|   |   |   | C | D | A | B |   |   |   |   |   |   |
|   |   |   |   | D | A | B | C |   |   |   |   |   |
|   |   |   |   |   | A | B | C | D |   |   |   |   |
| Swath 3 |   |   |   |   |   | B | C | D | A |   |   |   |
|   |   |   |   |   |   | C | D | A | B |   |   |   |
|   |   |   |   |   |   |   | D | A | B | C |   |   |
|   |   |   |   |   |   |   |   | A | B | C | D |   |

As can be seen in Table 1, the four patterns A, B, C, and D are interleaved between the successive print swaths. This interleaving or shingling helps conceal any white-banding or dark-banding that might occur due to errors in the medium advance mechanism. The first print swath is of necessity only a partial swath to begin the printing process at the top of a page or section of an image. As shown, once the steady state is achieved in the second swath, it takes four passes of the printhead to complete each full swath.

Figure 4:
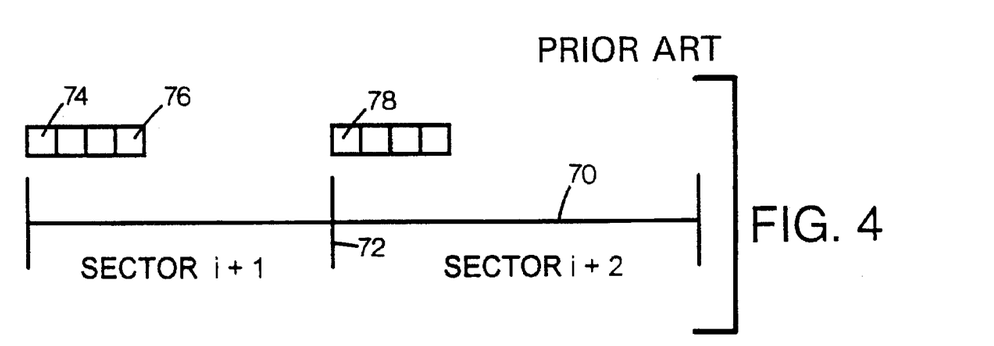
FIGS. 4–5 are schematic illustrations of time delays for previous print methods.
Figure 5:
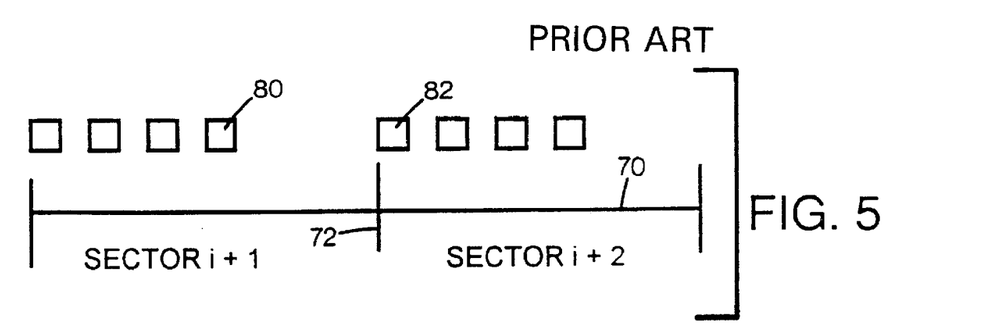
Figure 6:
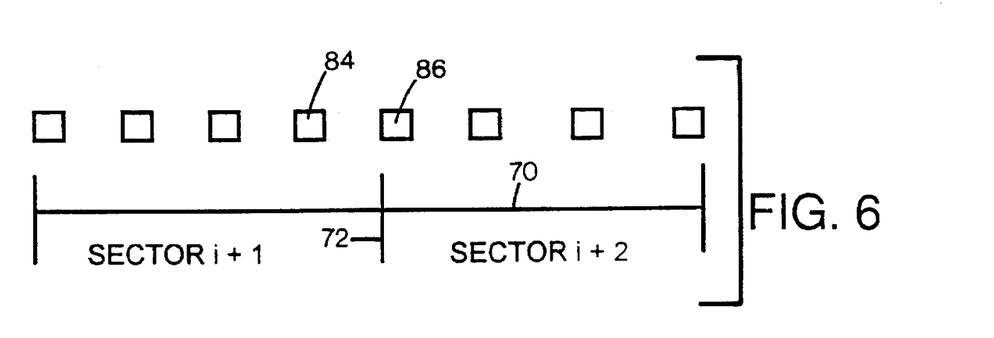
FIG. 6 is a schematic illustration of time delays for the a print method of the present invention.

The print passes printed by the mechanism manager 66 in response to the instructions received from the page sector manager 64 is illustrated in FIGS. 4–6. FIGS. 4 and 5 illustrate previous, less advantageous methods; whereas FIG. 6 illustrates the advantageous printing method of the present invention. The dark horizontal lines 70 in these Figures indicate time lines, with the divisions between one page sector, (sector i+1) and a subsequent sector (sector i+2) being marked by vertical lines 72. Each of the small squares, such as square 74 is intended to indicate when a given pass is made along the time line.

Delays can occur in two main areas, in the driver 56 and in the parser and renderer 62. The driver 56 can send data to the printer at various rates depending on the computational complexity of the data. This rate is not always constant because the complexity can vary widely for any given page. Delays can also be caused by the parser and renderer 62. However, a delay in the driver 56 effectively will result in a delay at the parser and renderer 62.

FIG. 4 illustrates what happens when there is no attempt to correct between the time delays between when the page sectors are ready to print and when the printer has finished printing all of the passes for a given page sector. As can be seen as soon as the sector i+1 is ready in FIG. 4, all four passes are made immediately. There is then a time delay before the next page sector (sector i+2) is composed by the driver and/or printer controller. Once sector i+2 is composed, again all four passes of this page sector are printed with the printer mechanism. Note that the time delay between the last pass 76 of sector i+1 and the first pass 78 of sector i+2 is much greater than the time delay between any of the previous four passes.

Therefore, the ink laid down between pass 76 and pass 78 will have more time to dry than the ink laid down in pass 78 and the three subsequent passes. Since the passes of the two page sectors i+1 and i+2 are interleaved, there will be slight color differences between the areas where overlapping passes are laid down on ink that has different amounts of time to dry. These differences of ink color will be perceived by the observer as horizontal bands of color of varying hues. This problem of color changes is referred to as "wait-banding." It is particularly a problem with dark secondary colors (using CMY primaries) such as dark blue.

FIG. 5 illustrates a simple technique for dealing with the wait-banding problem. In FIG. 5, a short fixed time delay is provided between each of the four print passes. As can be seen, this technique provides less of a delay after the last pass 80 of the first group and the first pass 82 of the second sector than was apparent in the method of FIG. 4. However, here again, there will be a color shift between the areas where there is a greater time delay between passes. If the time was the same for each page sector to be composed, it would be possible to provide the correct fixed time delay in the method of FIG. 5 so that the delay between inter-group passes was exactly the same as the delay between intra-group passes. However, the times for each page sector to be composed vary widely, so that such a fixed time delay would not work. FIGS. 4–6 illustrate equal time between when page sectors are composed, but this is not normally what happens in a true printing environment.

FIG. 6 illustrates a print mode according to the present invention in which a regulator is used to time differences between the time delays between print passes. As shown, the passes are spread out in time so that each pass is made at about the same time interval as between previous passes, regardless of which page sector the pass is part of. This print method therefore provides the beneficial result that there will be no wait-banding.

As stated, the time delays between when print page sectors are composed is not a constant. Variations in the complexity of the image and other factors, including the type of application or operating system used by the host, can cause the page sectors to be ready at different times. Therefore, the regulator of the present invention is programmed to determine a running average of the time delays between print passes. The following formula forms the basis for the algorithm used by the regulator.

$$T_{ave} = T_{ave} + [(T_n - T_{n-1}) - T_{ave}] * G$$

The term $T_{ave}$ is the running average of the time delay between when the passes are printed. As can be seen from this formula, the running average is changed each time the calculation is made. This formula is not an equation in the algebraic sense, but an assignment expression in a computer program (implemented in firmware) for repeatedly determining new values for $T_{ave}$. When $T_{ave}$ occurs on the fight-hand side of this expression, it refers to the old value for this term, which is resident in memory from a previous calculation or assignment. The $T_{ave}$ term on the left-hand side becomes the new value for this term once the calculation is complete. The term $T_n$ is the actual time that the most recent pass was made, and $T_{n-1}$ is the actual time that the pass before that was made. Therefore, the term $(T_n - T_{n-1})$ is the actual time between the last two passes, and may be referred to as $T_{actual}$ for the last pass.

The term $T_{ave}$ is calculated based on old $T_{actual}$ and $T_{ave}$. Once the new $T_{ave}$ is computed, the page sector manager can apply the new $T_{ave}$ to the print mode to determine when the next pass will be printed. After the next pass, a new $T_{ave}$ is calculated based on the most recent values for $T_{ave}$, $T_n$, and $T_{n-1}$ as actually experienced by the pass just completed. This process continues until the entire image or page is completed. To initialize the process, a beginning value for $T_{ave}$ must be provided. This is determined by taking the time for the first four passes, which are not regulated, and dividing this by four.

The error term $[(T_n - T_{n-1}) - T_{ave}]$ is the difference between the old $T_{actual}$ and the old $T_{ave}$. This error term is weighted by a factor of G (i.e., it is multiplied by G) before it is added to the old $T_{ave}$. The term G therefore determines how fast the new $T_{ave}$ will converge on $T_{actual}$. Numbers for G are preferably between 0 and 1, but may be other values. There are actually two G's, a $G_{up}$ and $G_{down}$. $G_{up}$ is used when the error term is positive, in other words, when $T_{ave}$ was shorter in time than $T_{actual}$. $G_{down}$ is used when the error term is negative, in other words when $T_{ave}$ was longer in time than $T_{actual}$. $G_{up}$ may be greater or less than $G_{down}$, depending on the type of printing desired. This is described more below.

Figure 7:
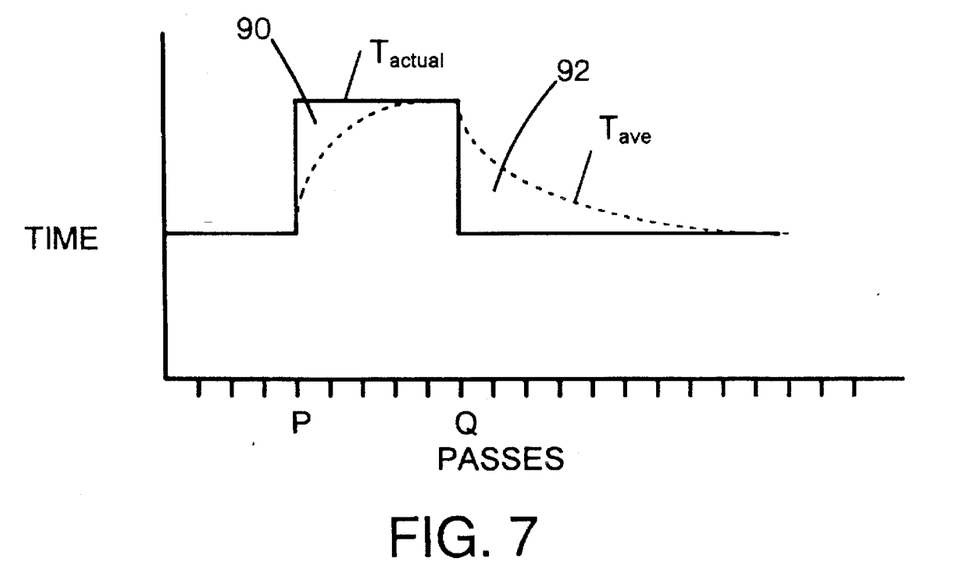
FIG. 7 is graph of $T_{ave}$ and $T_{actual}$.

The effect of the use of the above equation for computing the running average $T_{ave}$, along with the use of $G_{up}$ and $G_{down}$, are illustrated in FIG. 7, which is a graph with the X axis being divided in passes and the Y axis being measured in time. The solid line in the graph is $T_{actual}$, and the dotted line is $T_{ave}$. In the beginning stage up to the point labeled P, steady state has been achieved, and $T_{ave}$ is equal to or close to $T_{actual}$. In other words, $T_{actual}$ has been constant for a long enough time that $T_{ave}$ has essentially converged on $T_{actual}$. At point P, $T_{actual}$ suddenly changes to a higher value. This will result because the amount of time required to compose the page sectors suddenly increases, and the pass in question simply cannot print because page sector information is not ready from the sector manager. This could be due to, for example, a sudden increase in the complexity of the image, so that a bottleneck has occurred at the driver or in the page sector manager.

The above formula for computing $T_{ave}$ then begins to compute a new higher value for $T_{ave}$. In the example shown, since $T_{actual}$ is greater than $T_{ave}$ just after point P, the error term referred to above is positive. Therefore, $G_{up}$ is used. In this example, $G_{up}$ is ¼. As shown in FIG. 7, $T_{ave}$ converges on $T_{actual}$ asymptotically. The rate of this convergence depends on the value for G. Once $T_{ave}$ closely converges on $T_{actual}$, and if no change is made to $T_{actual}$, $T_{ave}$ will remain fairly constant and will closely match $T_{actual}$.

At point Q, $T_{actual}$ again goes down to its previous level. This might be due to, for example, the image suddenly decreasing in complexity. After point Q, the formula begins to adjust $T_{ave}$ downwards. In this case, the error term is negative, so that $G_{down}$ is used. In FIG. 7, $G_{down}$ is ⅛, which is less than $G_{up}$. Therefore, $T_{ave}$ converges more slowly on $T_{actual}$ than was experienced with $G_{up}$. If no further change is made to $T_{actual}$ after point Q, $T_{ave}$ will closely converge on $T_{actual}$, as shown.

In a "best mode" of an ink-jet printer, providing superior print quality, a preferred value for $G_{up}$ is ⅛ and a preferred value for $G_{down}$ is 1/32. In a normal mode, a preferred value for $G_{up}$ is ⅛ and $G_{down}$ is ¼. The reasons for these differences are now described. When $G_{up}$ is small (in relative terms) the computed $T_{ave}$ converges more slowly on $T_{actual}$, which will mean that there will be a longer time during which print passes will be printed faster than they need to. This will mean that there will be wait-banding between page sectors, such as occurs in FIGS. 4 and 5. This longer convergence time is represented by the area 90 between the curves between points P and Q. This area may therefore be considered to represent wait-banding.

After point Q in FIG. 7, $T_{ave}$ is greater than $T_{actual}$. This means that the running average $T_{ave}$ is longer than the actual time to compute page sectors, so that page sectors are ready to be printed. However, because of the running $T_{ave}$, the regulator 68 is not allowing passes of the printhead to be made. Therefore, the area 92 between the curves after point Q represents a loss of throughput of the printer. In other words, this area 92 represents a decrease in the pages per minute that the printer can be printed.

From this discussion, one might wonder why a value close to 1 for both $G_{up}$ and $G_{down}$ is not used to rapidly bring $T_{ave}$ into convergence with $T_{actual}$. The reason for this is that when printing actual images, $T_{actual}$ may change quickly up and down, so that at the boundaries of these changes, if $T_{ave}$ reflected exactly $T_{actual}$, there would be stark differences in the amount of time taken to print the passes of any given page sector. These rapid changes would produce distinct wait-banding. The above formula attempts to smooth out these changes so that wait-banding is mitigated.

In a best mode, a longer delay for converging on $T_{actual}$ from a point where $T_{ave}$ is greater than $T_{actual}$ is acceptable, because a gradual change in $T_{ave}$ is preferable for alleviation of wait-banding. In best mode, $G_{up}$ is greater than $G_{down}$ so that the printer slows down easily due to delays, therefore reducing wait-banding. However, in this mode, throughput is sacrificed. The tradeoff between improved print quality (reduced wait-banding) and reduced throughput is one that users are often willing to make in a best mode. In a normal mode, in which the user may want faster printing even if there might be some wait-banding, a higher value for $G_{down}$ may be used to minimized the area 92 between the curves in FIG. 7. In other words, in normal mode, $G_{up}$ is less than $G_{down}$, so that the primer will be reluctant to slow down when delays occur. Throughput will be maintained but more wait-banding is possible.

The above mentioned values for $G_{up}$ and $G_{down}$ for best and normal modes have been determined empirically for inhibiting wait-banding while at the same time avoiding unnecessary reductions in throughput. With the values of $G_{up}$ and $G_{down}$ given for the best mode, some throughput is lost as compared to the normal mode which has a higher value for $G_{down}$. A "draft" mode might have a value of 0 for G, with an assumed original value for $T_{ave}$ that will maximize throughput, without very much concern for wait-banding. A value of 0 for both $G_{up}$ and $G_{down}$ would provide a timing sequence for passes like that shown in FIG. 5. Another method of achieving a draft mode is to turn the regulator off. This would have the same effect as setting $G_{up}$ and $G_{down}$ to zero.

I claim:

1. A method of printing with a scanning ink-jet printhead, the method comprising:

providing image data;

composing page sectors of said image data, said page sectors being composed at a variable times;

printing a series of passes according to said image data, the timing of said passes being dependent on said variable times;

storing information regarding actual delays between when previous passes were printed;

determining an average time delay between said passes based on past experience with actual delays between when previous passes were printed; and printing subsequent passes according to said image data, the timing of said subsequent passes being based on said average time delay.

2. A method according to claim 1, wherein said average time delay is determined based on the difference between said average and said actual time delays.

3. A method according to claim 2, wherein said difference between said average and said actual time delays is weighted by a gain factor that determines how fast the average time delay converges on the actual time delay.

4. A method according to claim 3, wherein said gain factor is between 0 and 1.

5. A method according to claim 3, further comprising providing a gain factor $G_{up}$ for when said error term is positive and a separate gain factor $G_{down}$ for when said error term is negative.

6. A method according to claim 5, wherein $G_{up}$ is greater than $G_{down}$.

7. A method according to claim 5, wherein $G_{down}$ is greater that $G_{up}$.

8. A printing system, comprising:

a host computing device in which is stored image data;

a printer driver communicatively linked to said host computing device;

a printer controller communicatively linked to said printer driver; and a printer mechanism, including:
a medium advance mechanism communicatively linked to said controller,
a carriage scanning mechanism communicatively linked to said controller,
a printhead mounted to said carriage scanning mechanism and communicatively linked to said controller, wherein said controller composes page sector information of said data at variable times; and wherein said controller actuates said printer mechanism to print passes according to said page sector information at variable times, and including means for storing information regarding when previous passes were printed, said controller being programmed to determine an average time $T_{ave}$ for printing the next pass based on a past time $T_{actual}$ of when a previous pass was printed, said time $T_{actual}$ being dependent on said variable times for when page sector information was ready.

9. A method according to claim 8, wherein a new $T_{ave}$ is determined based on an error term involving the difference between the most recent $T_{ave}$ and $T_{actual}$.

10. A method according to claim 9, wherein said error term is weighted by a gain factor G that determines how fast $T_{ave}$ converges on $T_{actual}$.

11. A method according to claim 10, wherein said gain factor G is between 0 and 1.

12. A method according to claim 11, further comprising providing a gain factor $G_{up}$ for when said error term is positive and a separate gain factor $G_{down}$ for when said error term is negative.

13. A method according to claim 12, wherein $G_{up}$ is greater than $G_{down}$.

14. A method according to claim 12, wherein $G_{down}$ is greater than $G_{up}$.

* * * * *